United States Patent [19]
Fuller et al.

[11] 3,983,077
[45] Sept. 28, 1976

[54] PROCESS FOR MAKING CERAMIC RESISTOR MATERIALS

[75] Inventors: Peter G. Fuller, Lakeville, Mass.; Hans A. Stoeckler, Woonsocket, R.I.

[73] Assignee: Texas Instruments Incorporated, Dallas, Tex.

[22] Filed: May 2, 1975

[21] Appl. No.: 574,768

[52] U.S. Cl. .............................. 252/520; 252/521; 106/73.31
[51] Int. Cl.² ........................................ H01B 1/08
[58] Field of Search ..................... 252/520, 521; 106/73.31

[56] References Cited
UNITED STATES PATENTS

| | | | |
|---|---|---|---|
| 3,351,568 | 11/1967 | Waseleski et al. | 252/521 X |
| 3,586,642 | 6/1971 | Matsuo et al. | 252/521 X |

Primary Examiner—Benjamin R. Padgett
Assistant Examiner—E. Suzanne Parr
Attorney, Agent, or Firm—John A. Haug; James P. McAndrews; Russell E. Baumann

[57] ABSTRACT

A process for making barium titanate based materials and the like of positive temperature coefficient of resistivity having desirable and precisely predetermined thermal and electrical properties utilizes low cost starting materials and convenient and economical processing steps. Titanium dioxide powder is placed in suspension in an aqueous medium with dissolved compounds of barium and other selected materials while the pH of the medium is regulated within selected limits, whereby barium and other selected ions are adsorbed in predetermined ratio by suspended titanium dioxide particles and whereby water-soluble contaminants in the starting materials are placed in solution. An aqueous carbonate solution is then commingled with the titanium dioxide suspension in a controlled manner to form a precipitate which incorporates titanium dioxide and desired relative proportions of carbonates of barium and other selected materials in a homogenous mixture. The precipitate is filtered from the aqueous medium for effecting separation of the water soluble contaminants from the precipitate. The precipitate is subsequently dried and calcined and is preferably combined with a binder and fired for forming ceramic resistor elements.

14 Claims, 2 Drawing Figures

PROCESS FOR MAKING CERAMIC RESISTOR MATERIALS

Ceramic resistors of doped barium titanate or the like are known to display relatively low electrical resistance in one temperature range and are known to display very sharply increased resistance when heated to an anomaly temperature, the noted resistance levels and the anomaly temperature being characteristic of the particular resistor composition. These resistors, which can be heated to the noted anomaly temperatures either by changes in ambient temperature or by directing electrical current through the resistors, have found wide use as thermal sensing control elements, as self-regulating electrical heaters, and as current limiting devices and the like. Such resistors are commonly made by calcining mixtures of selected materials and by subsequently pressing and firing the calcined materials with a suitable binder. However, considerable difficulty has been experienced in providing the desired material mixture so that the mixture is free of contaminants which would be detrimental to the thermal and electrical properties of the subsequently formed resistors, and so that the mixture has the necessary degree of homogeneity and the precisely predetermined composition necessary to produce resistor elements having the desired electrical resistivities and anomaly temperatures. For example, in one conventional process for making barium titanate based resistors, a mixture of selected oxides is prepared by ball-milling. This procedure is slow and sometimes fails to provide the mixture with the desired homogeneity. More important, the resulting oxide mixture frequently includes contaminants, some introduced by the ball-milling itself, which have a detrimental effect on the properties of resistors made from the oxide mixture. In other processes commonly used in making such resistors, relatively expensive starting materials such as organic titanium compounds are dissolved in organic solvents and procedures such as flame spraying which are somewhat difficult to control have then been required in performing subsequent steps in the processes to produce the desired ceramic resistors.

It is an object of this invention to provide a novel and improved process for making barium titanate based ceramic resistors and the like; to provide such a process which utilizes low cost starting materials and which is economical to perform but which consistently produces resistor elements of desirable and precisely predetermined electrical and thermal properties; and to provide such a process which is easily regulated to produce ceramic resistor elements with any of various different but precisely predetermined electrical and thermal properties.

Briefly described, the novel and improved process of this invention comprises the step of preparing a suspension of a titanium dioxide powder in an aqueous medium. Low cost titanium dioxide powders including collodial titanium dioxide powders having particle sizes averaging 0.1 microns or less or pigment type powders of relatively larger particle size such as rutile titanium dioxide pigment and anatase titanium dioxide filler pigment are preferably used for maximum economy. This aqueous suspension is combined with an aqueous solution of barium salts and salts of selected dopant materials and the like. Again low cost materials such as barium acetate and yttrium nitrate are preferably used for this purpose. Preferably the titanium dioxide suspension is subjected to vigorous stirring and the pH of the suspension is regulated in the range from about 7.0 to 8.0 while the aqueous suspension and salt solution are combined. In this procedure, those contaminants in the starting materials which would be detrimental to ceramic resistors made from the materials, which contaminants tend to be present only in water soluble forms, are dissolved in the aqueous medium. Most important, barium ions and ions of the selected dopant materials are adsorbed in a precisely predetermined ratio by the suspended titanium dioxide particles, thereby providing the desired homogenous mixture of ceramic-forming constituents in the relative proportions.

In accordance with this invention, the titanium dioxide suspension with its combined salt solution is commingled with an aqueous carbonate solution or the like, preferably by directing regulated streams of the suspension and carbonate solution together in a small volume mixing chamber. Typically, for example, streams of the aqueous suspension and the solution of the aqueous carbonate solution are brought together in a Y-shaped conduit leading to a nearby storage container. In this procedure, a precipitate is formed which incorporates precisely predetermined proportions of titanium dioxide, barium carbonate, and carbonates of the selected dopants or the like in a thoroughly homogenous mixture. The noted precipitate is then filtered from the aqueous medium. In this way, removal of contaminants from the starting materials is effected by withdrawing the contaminants with the water filtrate. The filtered precipitate is dried and calcined and is preferably combined with a binder and fired in conventional manner for forming ceramic mixed metal oxide resistor elements of precisely predetermined electrical and thermal properties. The process of this invention thus utilizes low cost starting materials as well as convenient, economical and easily controlled procedural steps but produces high quality resistor materials of precisely predetermined and consistently reproducible properties. The process is also easily regulated for producing resistor materials of different desired thermal and electrical properties.

Other objects, advantages and details of the novel and improved process of this invention appear in the following detailed description of preferred embodiments of the invention, the detailed description referring to the drawings in which:

Figure 1:
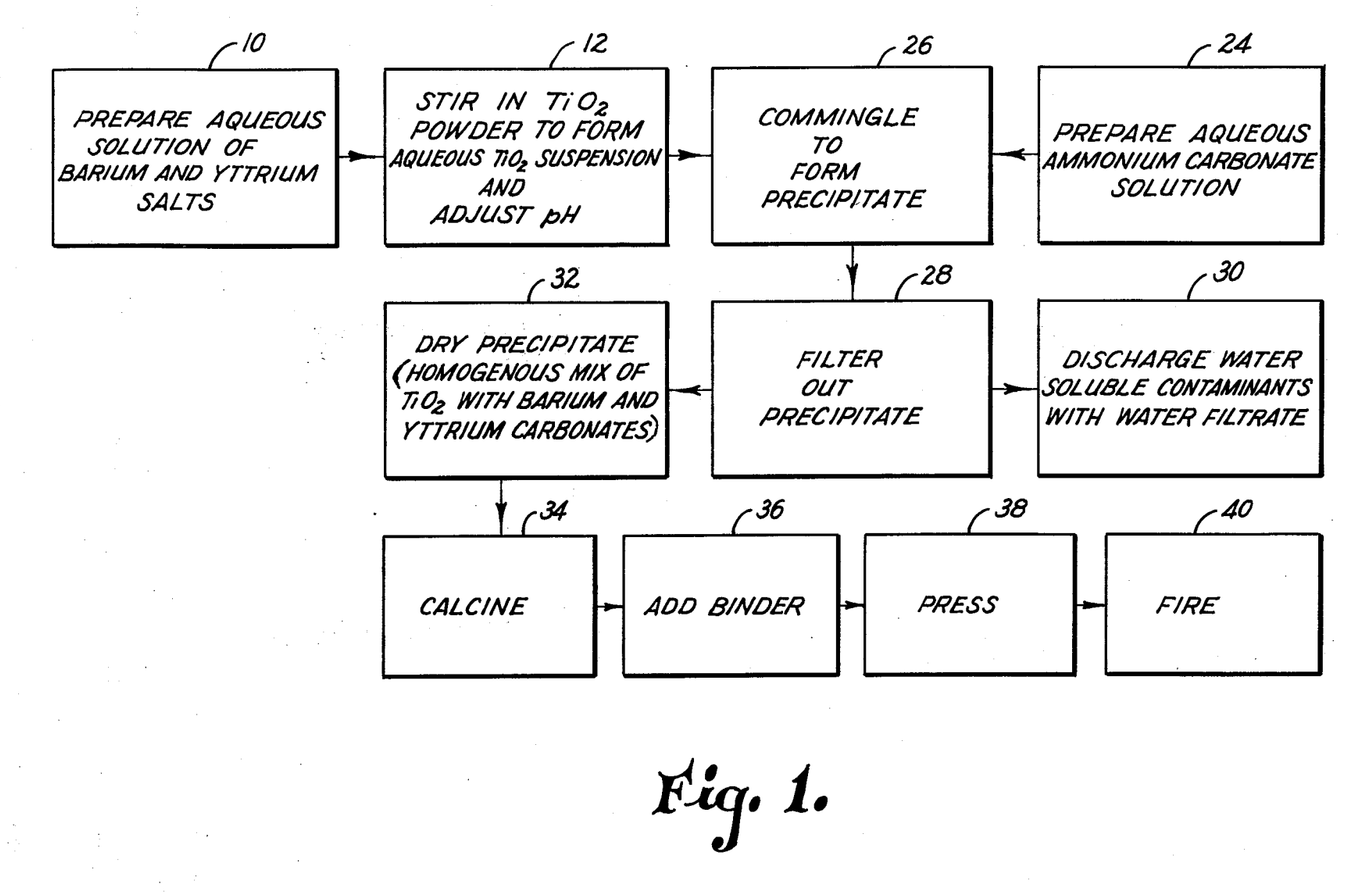
FIG. 1 is a block diagram illustrating the steps in a preferred embodiment of the process of this invention.

Referring to the drawings, the novel and improved process of this invention is typically employed in producing a yttrium-doped barium titanate resistor material as is diagrammatically illustrated in FIG. 1. However, this process is also used in producing other mixed metal oxides such as correspondingly doped strontium, calcium or lead titanates, or mixtures of such titanates, or corresponding stannates or zirconates, or mixtures of such titanates, stannates and zirconates. The ceramic compositions produced by the process of this invention also typically include additions of silicon oxide or manganese oxide or the like and other dopants typically incorporated in such ceramic compositions include lanthanum, cerium, dysprosium, and praesodymium as well as other rare earths and the like commonly used in ceramic resistor materials of positive temperature coefficient of resistivity. Typically, the ceramic titanate materials produced by the process are provided with stoichiometric or slightly titanium-rich compositions, the compositions preferably having an excess of up to about 3 mole percent titanium oxide.

In the preferred embodiment of the process of this invention as illustrated in FIG. 1 for example, water soluble compounds of barium and yttrium are dissolved in an aqueous solvent as indicated at 10 in FIG. 1, thereby to provide a desired relative proportion of barium and yttrium ions with a desired uniform distribution of these ions in the water medium as a result of the formation of the solution. Any organic or inorganic compounds of barium and yttrium which are water soluble are suitable for this purpose, such compounds typically including barium acetate ($BaAc_2$) and barium chloride ($BaCl_2$) as well as yttrium nitrate [$Y(NO_3)_3$] and yttrium acetate ($Y\ AC_3$). Of course, use of relatively lower cost materials is preferred for reasons of economy and in a preferred embodiment of this invention illustrated in FIG. 1, barium acetate and yttrium nitrate are placed in common solution as above-described. As will be understood, where strontium, calcium or lead titanates are to be formed, or where other dopants as noted above are to be used, corresponding water soluble compounds of strontium, calcium or lead or of the noted additions or dopants are dissolved in the aqueous solution. If desired to facilitate dissolving of the various compounds, the solution is heated, or the pH of the solution is adjusted by the addition of hydrochloric or nitric acid or the like. Preferably also the solution is subjected to vigorous stirring in conventional manner to assure complete dissolving of all of the water soluble compounds placed in the solution.

In accordance with this invention, where a yttrium-doped barium titanate material is to be formed, an aqueous suspension of a titanium dioxide power is prepared and combined with the barium-yttrium solution noted above as illustrated at 12 in FIG. 1. In this regard, the particle sizes of the titanium dioxide powder are in the range from about 0.005 to 0.5 microns such that the powder in its finely divided state is uniformily distributed throughout the water dispersing medium and does not tend to settle out at any appreciable rate on standing. The titanium dioxide suspension is adapted to be prepared separately if desired and is then added to the barium-yytrium solution or, alternately, the noted barium and yttrium compounds are dissolved in the aqueous suspension. Preferably, however, for material handling convenience, the titanium dioxide powder is preferably added as a powder to the barium-yttrium solution previously prepared as shown at 12 in FIG. 1, the solution being vigorously stirred or otherwise mechanically mixed in a conventional manner as the powder is added for assuring maximum dispersion of the titanium dioxide powder in the aqueous medium. In this way, the desired relative proportion of titanium dioxide is combined with the previously noted barium and yttrium materials and, because the powder is placed in aqueous suspension, a homogeneous distribution of the titanium dioxide is achieved in the aqueous medium.

Any of the various low cost titanium dioxide powders which are commercially available are adapted for use in the process of this invention, such powders including colloidal titanium dioxide powder as well as pigment powders such as rutile titanium dioxide pigment or anatase titanium dioxide pigment. Preferably, for example, the desired titanium dioxide suspension is prepared using colloidal titanium dioxide powder made by reacting a stream of gaseous titanium tetrachloride in an oxygen flame or by hydrolysis of titanium tetrachloride, such material, which has an average particle size of less than about 0.1 microns, being commercially available from Degussa Incorporated under the trade designation P25 Colloidal Titanium Dioxide and having less than 300 ppm. aluminum, and less than 20 ppm. of iron, sodium, potassium, copper and magnesium, present as impurities.

Alternately, where pigment-type titanium dioxide powders are used, the powders are preferably subjected to preliminary purification prior to use for removal of gross contaminants such as the particle coatings commonly provided in such pigment powders. For example, a typical rutile titanium dioxide pigment, preferably prepared by hydrolysis of a sulphate solution, by hydrolysis of titanium tetrachloride, or by reaction of gaseous titanium tetrachloride with oxygen, is adapted for use in the process of this invention, such a pigment being commercially available from Dupont de Nemours Company under the designation Ti Pure 100, Ti Pure 101, Ti Pure 102, or Ti Pure LW and having up to about 2 percent by weight (10,000 ppm.) aluminum, up to about 2 percent by weight silicon dioxide, less than about 1,000 ppm. potassium, and less than 20 ppm. iron, sodium, copper and magnesium present as impurities or particle coating materials.

Similarly a typical anatase titanium dioxide filler pigment, preferably prepared in a manner similar to that described-above with respect to the rutile pigment, is adapted for use in the process of this invention, such pigment material being commercially available from National Lead Company under the designation TGA Titanium Dioxide Filler Pigment and having up to about 2 percent by weight of aluminum, up to 2 percent by weight silicon dioxide, less than about 1,000 ppm. potassium, and less than 20 ppm. iron, sodium, copper and magnesium present as impurities and particle coating materials.

Figure 2:
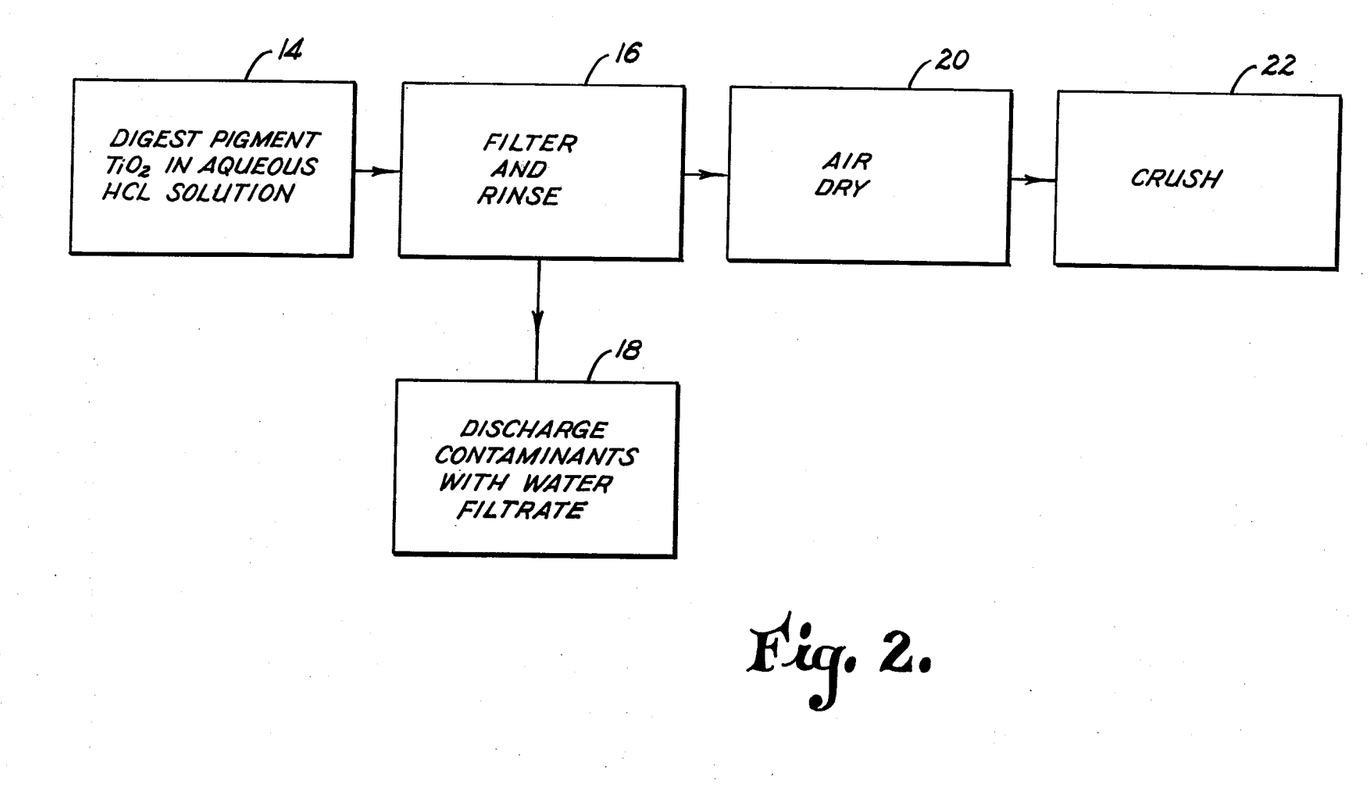
FIG. 2 is a block diagram illustrating a preliminary purification procedure optionally employed with the process of this invention.

Such pigment materials are adapted to be purified in any conventional way. For example, as illustrated in FIG. 2, the powders are preferably added to an aqueous 6M hydrochloric acid solution at about 70°C. while the powder is digested in the acid solution by vigorous stirring or other mechanical mixing for about 10 to 15 minutes as indicated at 14 in FIG. 2. In this procedure, contaminants such as various iron, aluminum, sodium and potassium compounds which are commonly found in such pigments, and which are generally present in water soluble form, are dissolved from the titanium oxide powder. The powder is then filtered from the acid solution in any conventional manner and is preferably rinsed with water for removal of all acid as indicated at 16 in FIG. 2. In this way, contaminants from the pigment powder which are dissolved in the water filtrate are discharged as indicated at 18 in FIG. 2. The purified pigment powder is then dried, preferably by use of forced air at about 200°C. as indicated at 20 in FIG. 2, and the dried powder is subjected to conventional roller mill crushing or the like as indicated at 22 in FIG. 2 to break up any agglomerations of the pigment particles. As thus purified, the pigment powders are then adapted for use in preparing the titanium dioxide suspension in the process of this invention as previously described.

As will be understood, where the ceramic resistor materials to be formed are intended to incorporate silicon oxide or manganese oxide constituents, corresponding silicon or manganese oxide powders are also placed in aqueous suspension with the titanium dioxide powder suspension as that suspension is formed as indicated at 14 in FIG. 1. Where such a silicon dioxide powder is used, the powder preferably has an average particle size of about 0.1 microns or less, a suitable silicon dioxide powder used for this purpose being commercially available from Cabot Corporation under the designation Cab-O-Sil. Such a material, preferably formed by hydrolysis of silicon tetrachloride or reaction of a gaseous stream of silicon tetrachloride with oxygen, incorporates less than about 300 ppm. aluminum and less than 20 ppm. iron, sodium, potassium, copper and magnesium present as impurities. Alternately a manganese addition to the resistor materials is achieved by dissolving a water soluble manganese salt such as manganese nitrate [$Mn(NO_3)_2$] in the aqueous solution indicated at 10 in FIG. 1. Similarly, where the desired ceramic resistor materials are to comprise stannates or zirconates or mixtures of titanates, stannates or zirconates, aqueous suspensions of tin oxide or zirconium oxide are added to or substituted for the titanium dioxide suspension noted above at 12 in FIG. 1.

In accordance with this invention, the pH of the combined aqueous suspension-solution above-described is preferably adjusted, preferably to the isoelectric point of the major constituent of the powder suspension, thereby to enhance stability of the suspension. Typically, for example, such pH adjustment is accomplished by slow addition of a 50% aqueous ammonium hydroxide solution to the combined suspension-solution while vigorous stirring of the suspension-solution is continued. Preferably, where a yttrium-doped barium titanate material is to be formed, the pH is adjusted into the range from about 7.0 to 8.0.

In the process of this invention as thus far described, a homogenous distribution of barium, yttrium and related materials is achieved in the aqueous medium by reason of placing these materials in solution. Similarly, a corresponding homogenous distribution of the titanium dioxide or other related powder material is achieved in the aqueous medium by reason of placing this powder material in suspension. Further, it is believed that the titanium dioxide powders and other powder materials placed in suspension are hydrated in the suspension and tend to adsorb barium and yttrium ions and ions of related materials in a selected ratio around the titanium dioxide particles, thereby to obtain a desired uniform homogeneous mixture of titanium, barium and yttrium materials and the like within the aqueous medium. Further, because most of the contaminants likely to be found in the noted titanium, barium or yttrium starting materials or the like tend to be present in water-soluble forms, such as contaminants are dissolved in the aqueous suspending medium.

In accordance with this invention, an additional aqueous carbonate solution is prepared as indicated at 24 in FIG. 1. Preferably for example, an ammonium carbonate [$(NH_4)_2CO_3$] solution is prepared in any conventional manner. Alternately, equivalent solutions of oxalates or citrates or the like are substituted for such a carbonate solution within the scope of this invention. This additional carbonate solution is then commingled in a controlled but easily regulated manner with the combined aqueous suspension-solution previously described as indicated at 26 in FIG. 1. Typically, for example, regulated streams of the carbonate solution and of the combined suspension-solution are pumped at a relatively slow rate of about 1.5 liters/minute through respective conduits of about 0.5 inches diameter and are then flowed together into a mixing conduit of corresponding diameter and about 1 to 4 feet length through a Y-shaped conduit connector, the resulting combined liquid then being discharged into a suitable nearby storage container. In this procedure, relatively small volumes of the carbonate, oxalate or citrate solution and of the combined suspension-solution are thoroughly mixed in the small volume chamber formed by the mixing conduit and a precipitate is formed in a controlled manner for discharge into the storage container. That is, corresponding barium, yttrium and other carbonates, oxalates, or citrates are formed by the ions which have been absorbed by the suspended materials such as titanium dioxide and, accordingly, the precipitate formed in this stage of the process is found to comprise a homogenous mixture of titanium dioxide and such carbonates, oxalates or citrates of barium, yttrium and other related materials. As will be understood, any desired relative proportions of the noted materials in the precipitate are achieved by regulating the relative concentrations and volumes of the noted suspensions and solutions. Typically, for example, the concentrations are regulated so that each mole of resistor material to be provided embodies a combined total of about 1.00 to 1.03 moles of titanium dioxide, tin oxide and zirconium oxide placed in the noted suspension and a combined total of about 1.00 mole of barium, strontium, calcium and lead materials placed in solution in the aqueous suspending medium. Relatively smaller molar proportions of silicon dioxide and manganese oxide and of the dopant materials are employed in the aqueous medium. Typically, also, the carbonate solution is provided with a concentration of from about 1.0 to 2.0 M with a sufficient quantity of the carbonate solution being prepared to assure full reacting of all barium, strontium, calcium and lead materials dissolved in the combined suspension-solution. As will be understood, the relatively low concentrations required for the various suspensions and solutions used in the process of this invention are easily achieved and regulated in carrying out the process of this invention.

In accordance with this invention, the precipitate formed by commingling of the carbonate solution and the combined suspension-solution as noted above is filtered out by any conventional means as indicated at 28 in FIG. 1 and, as indicated at 30 in FIG. 1, the water filtrate resulting from the filtering is discharged to carry off substantially all of the water-soluble contaminants which had been present in the original starting materials. As indicated at 32 in FIG. 1, the filtered precipitate comprising a homogenous mix of desired materials in desired relative proportion is then dried in any conventional manner as by holding the precipitate in an oven in an air atmosphere at a temperature in the range from about 100°C. to 500°C. for a period on the order of two hours sufficient to remove substantially all water content from the precipitate.

As indicated at 34 in FIG. 1, the dried precipitate provided by the process of this invention is then calcined or pyrolyzed in any conventional manner for producing the desired ceramic resistor materials having the desired thermal and electrical properties. While any conventional calcining procedure is utilized within the scope of this invention, the dried precipitate provided by this invention is typically calcined in the following manner. That is, the dried precipitate materials are disposed on mullite or silica trays and are heated in air or other neutral or oxidizing atmosphere at a temperature in the range from about 650°C. to 1425°C. for a period of about 1 to 4 hours to form the desired ceramic mixed metal oxide resistor materials. Preferably for example, the dried precipitate is calcined in air for 1 to 2 hours at a temperature in the range from about 1050°C. to 1350°C.

Following conventional calcination as above-described, the calcined resistor material comprises a lumpy powder which, as is indicated at 36 in FIG. 1, is preferably combined with a conventional binder material in any conventional manner. Typically, for example, the calcined material is crushed or pulverized and sieved to form a finely divided particulate material. This powder material is then thoroughly mixed with a 3 to 10% by weight solution of polyvinyl alcohol in distilled water to form a smooth slurry. The slurry is then dried by mild heating to produce a binder mixture preferably comprising about 1 to 3% by weight of polyvinyl alcohol. As indicated at 38 in FIG. 1, this binder mixture is then pressed to form resistor element blanks, typically of about 0.500 inches diameter and 0.125 inches thickness and, as indicated at 40 in FIG. 1, these element blanks are fired in air to produce desired ceramic resistor elements. Such pressing and firing is performed in any conventional way in accordance with this invention but typically the binder mixture is compacted at pressures on the order of 5000 pounds per square inch to assure uniform and proper density in the pressed element blanks. The element blanks are then heated in air on a zirconia or platinum foil or the like for fusing or sintering the powdered resistor particles together while driving off or volatilizing the binder component from the pressed blanks, such firing being continued for 10 to 30 minutes at a temperature in the range from about 1300°C. to 1450°C. The fired blanks are then annealed at a lower temperature on the order of 1200° to 1300°C. for about 2 hours.

The following examples illustrate this invention.

EXAMPLE 1

Approximately 29.5 kilograms of barium acetate ($BaAc_2$), 7.41 kilograms of strontium acetate ($SrAc_3$), and 326 grams of yttrium nitrate pentahydrate [$Y(NO_3)_3 \cdot 5H_2O$] are dissolved with mechanical mixing in 90 liters of deionized water at room temperature in a stainless steel tank, about 40 ml. of concentrated nitric acid ($HNO_3$) being added to facilitate dissolving of these materials. In addition, about 36.8 grams of a 50% aqueous solution of manganese nitrate is added to the solution. About 12.35 kilograms of colloidal titanium dioxide ($TiO_2$) powder as above-described and about 315.4 grams of silicon dioxide ($SiO_2$) powder as above-described are then added to the previously prepared aqueous solution and are placed in suspension in the aqueous medium by vigorous stirring as by use of a Cowles Disperser operated at 3400 rpm for 10 to 15 minutes. In this way, the combined suspension-solution embodies 0.77 moles barium, 0.23 moles strontium, 0.006 moles yttrium, and 0.035 silicon dioxide for each 1.01 moles of titanium dioxide in the combined suspension-solution and embodies sufficient manganese to comprise about 170 ppm. of the resulting titanate. As will be understood appropriate small adjustment of this weight is made to compensate for varying moisture content of the powders. About 300 ml. of concentrated ammonium hydroxide ($NH_4OH$) is then added to the combined suspension-solution to adjust the pH thereof to about 7.4. A 1.2 molar aqueous solution of ammonium carbonate is then prepared by dissolving about 27.35 kilograms of the carbonate in about 200 liters of deionized water in a stainless steel tank at room temperature. This carbonate solution and the previously prepared suspension-solution are then commingled by directing streams of these materials at a rate of about 1.5 liters/minute through conduits of about 0.5 inches diameter, through a Y-shaped conduit connector into a mixing conduit of corresponding diameter of a length of about 1 to 4 feet, and into a storage container. In this way a precipitate is formed which is filtered out in any conventional manner and which is then dried in air in an oven at 500°C. for about 2 hours. After pulverizing and sieving, the dried powder is calcined in air or mullite or silica at 1250°C. for about 1 hour. The calcined material is then pressed into element blanks of about 0.5 inches diameter and 0.125 inches thickness at a pressure of 5000 psi. and the blanks are fired in air on zirconia bricks at 1350°C. for 15 minutes followed by continued heating at 1250°C. for 1 hour. The resulting metal oxide materials of the resistor elements have an approximate empirical formula of $Ba_{.77}Sr_{.23}Y_{.006}Si_{.035}TiO3_{1.01}$ including about 170 ppm. manganese and have a formula weight of 223.8 grams/mole. The elements have a room temperature resistivity of about 10 ohm-centimeters, display a sharply increased resistivity at an anomaly or Curie temperature of about 57°C., and display a resistivity greater than about $10 \times 10^6$ ohm-centimeters at a temperature slightly above 57°C. The elements have a dense homogenous composition with a density of about 5.3 grams/cc. and are consistently reproducible with the noted thermal and electrical properties using the noted process.

EXAMPLE 2

Approximately 37.55 kilograms of barium acetate, 1.14 kilograms lead acetate, 380.4 grams yttrium nitrate, and 34.1 grams of 50% aqueous manganese nitrate solution are dissolved in 100 liters of an aqueous medium as above-described using nitric acid to facilitate dissolving of the various materials in the medium. Then 12.35 kilograms of colloidal titanium dioxide and 315.4 grams of silicon dioxide are placed in suspension in the medium as above-described. In this way, the combined suspension-solution embodies 0.98 moles of barium, 0.02 moles lead, 0.007 moles yttrium, and 0.035 moles silicon for each 1.01 moles titanium and embodies sufficient manganese to comprise about 150 ppm. of the resulting titanate. After dispersion and pH adjustment in the manner noted above, and after commingling of the aqueous medium with 200 liters of a 1.2 molar aqueous solution of ammonium carbonate, a precipitate is formed as noted above. This precipitate is filtered, dried, calcined, combined with a binder, pressed and fired substantially as noted above to provide resistor elements of a size comparable to those described in Example 1. The metal oxide material of these elements is found to have an approximate empirical formula of $Ba_{.98}Pb_{.02}Y_{.007}Si_{.035}TiO3_{1.01}$ including about 150 ppm. manganese and has a formula weight of 234.63 grams/mole. These elements have a dense, homogenous structure, have a room temperature resistivity of about 15 ohm-centimeters, an anomaly or Curie temperature of about 140°C., and display a resistivity of greater than $10 \times 10^6$ ohm-centimeters at temperature slightly above 140°C.

EXAMPLE 3

Approximately 34.1 kilograms of barium acetate, 6.26 kilograms of lead acetate, 380.4 grams of yttrium nitrate, and 23.3 grams of a 50% aqueous solution of manganese nitrate are dissolved in 100 liters of water as above-described using nitric acid to facilitate dissolving of these materials in the aqueous medium. Then 12.35 kilograms of colloidal titanium dioxide powder and 315.4 grams of silicon dioxide powder are placed in suspension in the medium as above-described. In this way, the combined suspension-solution embodies 0.89 moles barium, 0.11 moles lead, 0.007 moles yttrium and 0.035 moles silicon for each 1.01 moles titanium and embodies sufficient manganese to comprise about 100 ppm. of the resulting titanate. After dispersion and pH adjustment in the manner noted above, and after commingling of the aqueous medium with 200 liters of 1.2 molar aqueous ammonium carbonate solution, a precipitate is formed as noted above. This precipitate is filtered, dried, calcined, combined with a binder, pressed and fired substantially as noted above to provide resistor elements of a size comparable to those described in Example 1. The metal oxide of these elements is found to have an approximate empirical formula of $Ba_{.89}Pb_{.11}Y_{.007}Si_{.035}TiO3_{1.01}$ including about 100 ppm. manganese and have formula weight of 240.9 grams/mole. These elements have a dense, homogenous structure, have a room temperature resistivity of about 20 ohm-centimeters, an anomaly or Curie temperature of about 180°C., and have a resistivity greater than about $10 \times 10^7$ at temperatures slightly above 180°C.

EXAMPLE 4

Approximately 36.34 kilograms of barium acetate, 2.85 kilograms of lead acetate, and 217.4 grams of yttrium nitrate are dissolved in 100 liters of an aqueous medium as above-described. Then 12.35 kilograms of colloidal titanium dioxide and 270.4 grams of silicon dioxide powder are placed in suspension in the medium as above-described. In this way, the combined suspension-solution embodies 0.95 moles barium, 0.05 moles lead, 0.004 moles yttrium and 0.03 moles silicon for each 1.01 moles titanium. After dispersion and pH adjustment in the manner noted above, and after commingling of the aqueous medium with 200 liters of a 1.2 molar aqueous solution of ammonium carbonate, a precipitate is formed as noted above. This precipitate is filtered, dried, calcined, combined with a binder, pressed and fired substantially as noted above to provide resistor elements of a size comparable to those described in Example 1. The metal oxide material of these elements is found to have an approximate empirical formula of $Ba_{.95}Pb_{.05}Y_{.004}Si_{.03}TiO3_{1.01}$. These elements have a dense, homogenous structure, have a room temperature resistivity of about 20 ohm-centimeters, an anomaly or Curie temperature of about 154°C., and display a resistivity of greater than $10 \times 10^6$ ohm-centimeters at temperatures slightly above 154°C.

EXAMPLE 5

Approximately 26.82 kilograms of barium acetate, 7.59 kilograms of lead acetate, 271.7 grams of yttrium nitrate, and 19.7 grams of a 50% aqueous manganese nitrate solution are dissolved in 100 liters of an aqueous medium as above-described using nitric acid to facilitate dissolving of the various materials in the medium. Then 10.39 kilograms of colloidal titanium dioxide and 225.3 grams of silicon dioxide powder are placed in suspension in the medium as above-described. In this way, the combined suspension-solution embodies 0.84 moles barium, 0.16 moles lead, 0.006 moles yttrium and 0.03 moles silicon for each 1.02 moles titanium and embodies sufficient manganese to comprise about 50 ppm. of the resulting titanate. After dispersion and pH adjustment in the manner noted above, and after commingling of the aqueous medium with 200 liters of 1.2 molar aqueous solution of ammonium carbonate, a precipitate is formed as noted above. This precipitate is filtered, dried, calcined, combined with a binder, pressed and fired substantially as noted above to provide resistor elements cf a size comparable to those described in Example 1. The metal oxide material of these elements is found to have an approximate empirical formula of $Ba_{.84}Pb_{.16}Y_{.006}Si_{.03}TiO3_{1.02}$ including about 50 ppm. manganese and have a formula weight of 244.41 grams/mole. These elements have a dense, homogenous structure, have a room temperature resistivity of about 20 ohm-centimeters, an anomaly or Curie temperature of about 200°C., and display a resistivity of greater than $10 \times 10^6$ ohm-centimeters at temperatures slightly above 200°C.

EXAMPLE 6

Approximately 36.40 kilograms of barium acetate, about 1.61 kilograms of strontium acetate, and 217.4 grams of yttrium nitrate are dissolved in 100 liters of an aqueous medium as above-described. Then 12.35 kilograms of colloidal titanium dioxide and 315 grams of silicon dioxide powder are placed in suspension in the medium as above-described. In this way, the combined suspension-solution embodies 0.95 moles barium, 0.05 moles strontium, 0.004 moles yttrium and 0.035 moles silicon for each 1.01 moles titanium. After dispersion and pH adjustment in the manner noted above, and after commingling of the aqueous medium with 200 liters of 1.2 molar aqueous solution of ammonium carbonate, a precipitate is formed as noted above. This precipitate is filtered, dried, calcined, combined with a binder, pressed and fired substantially as noted above to provide resistor elements of a size comparable to those described in Example 1. The metal oxide material of these elements is found to have an approximate empirical formula of $Ba_{.95}Sr_{.05}Y_{.004}Si_{.035}TiO3_{1.01}$. These elements have a dense, homogenous structure, have a room temperature resistivity of about 15 ohm-centimeters, an anomaly or Curie temperature of about 115°C., and display a resistivity of greater than $10 \times 10^5$ ohm-centimeters at temperatures slightly above 115°C.

EXAMPLE 7

Approximately 29.05 kilograms of barium acetate, about 4.27 kilograms of lead acetate, 271.7 grams of yttrium nitrate, and 19.3 grams of 50% aqueous manganese nitrate solution are dissolved in 100 liters of an aqueous medium as above-described using nitric acid to facilitate dissolving of the various materials in the medium. Then 10.29 kilograms of colloidal titanium dioxide and 262.8 grams of silicon dioxide powder are placed in suspension in the medium as above-described. In this way, the combined suspension-solution embodies 0.91 moles barium, 0.09 moles lead, 0.006 moles yttrium and 0.035 moles silicon for each 1.01 moles titanium and embodies sufficient manganese to comprise about 150 ppm. of the resulting titanate. After dispersion and pH adjustment in the manner noted above, and after commingling of the aqueous medium with 200 liters of a 1.2 molar aqueous solution of ammonium carbonate, a precipitate is formed as noted above. This precipitate is filtered, dried, calcined, combined with a binder, pressed and fired substantially as noted above to provide resistor elements of a size comparable to those described in Example 1. The metal oxide material of these elements is found to have an approximate empirical formula of $Ba_{.91}Pb_{.09}Y_{.006}Si_{.035}TiO3_{1.01}$ including about 150 ppm. manganese and have a formula weight of 239.52 grams/mole. These elements have a dense, homogenous structure, have a room temperature resistivity of about 15 ohm-centimeters, an anomaly or Curie temperature of about 165°C., and display a resistivity of greater than $10 \times 10^5$ ohm-centimeters at temperatures slightly above 165°C.

EXAMPLE 8

Approximately 32.95 kilograms of barium acetate, about 4.51 kilograms strontium acetate, 326.1 grams yttrium nitrate, and 37.2 grams of 50% aqueous manganese nitrate solution are dissolved in 100 liters of an aqueous medium as above-described using nitric acid to facilitate dissolving in the various materials in the medium. Then 12.47 kilograms of colloidal titanium dioxide and 315.4 grams of a silicon dioxide powder are placed in suspension in the medium as above-described. In this way, the combined suspension-solution embodies 0.86 moles barium, 0.14 moles strontium, 0.006 moles yttrium and 0.035 moles silicon for each 1.02 moles titanium and embodies sufficient manganese to comprise about 226 ppm. of the resulting titanate. After dispersion and pH adjustment in the manner noted above, and after commingling of the aqueous medium with 200 liters of a 1.2 molar aqueous solution of ammonium carbonate, a precipitate is formed as noted above. This precipitate is filtered, dried, calcined, combined with a binder, pressed and fired substantially as noted above to provide resistor elements of a size comparable to those described in Example 1. The metal oxide material of these elements is found to have an approximate empirical formula of $Ba_{.86}Sr_{.14}Y_{.006}Si_{.035}TiO3_{1.02}$ including about 226 ppm. manganese and have a formula weight of 226.27 grams/mole. These elements have a dense, homogenous structure, have a room temperature resistivity of about 15 ohm-centimeters, an anomaly or Curie temperature of about 80°C., and display a resistivity of greater than $10 \times 10^5$ ohm-centimeters at temperatures slightly above 80°C.

EXAMPLE 9

Approximately 35.63 kilograms of barium acetate, 2.254 kilograms strontium acetate, 326.1 grams yttrium nitrate, and 22.3 grams of 50% aqueous manganese nitrate solution are dissolved in 100 liters of an aqueous medium as above-described using nitric acid to facilitate dissolving in the various materials in the medium. Then 12.35 kilograms of colloidal titanium dioxide and 315.4 grams of silicon dioxide powder are placed in suspension in the medium as above-described. In this way, the combined suspension-solution embodies 0.93 moles barium, 0.07 moles strontium, 0.006 moles yttrium and 0.035 moles silicon for each 1.01 moles titanium and embodies sufficient manganese to comprise about 230 ppm. of the resulting titanate. After dispersion and pH adjustment in the manner noted above, and after commingling of the aqueous medium with 200 liters of a 1.2 molar aqueous solution of ammonium carbonate, a precipitate is formed as noted above. This precipitate is filtered, dried, calcined, combined with a binder, pressed and fired substantially as noted above to provide resistor elements of a size comparable to those described in Example 1. The metal oxide material of these elements is found to have an approximate empirical formula of $Ba_{.93}Sr_{.07}Y_{.006}Si_{.035}TiO3_{1.01}$ including about 230 ppm. manganese and have a formula weight of 230.56 grams/mole. These elements have a dense, homogenous structure, have a room temperature resistivity of about 15 ohm-centimeters, an anomaly or Curie temperature of about 105°C., and display a resistivity of greater than $10 \times 10^5$ ohm-centimeters at temperatures slightly above 105°C.

It should be understood that although a preferred embodiment of the process of this invention has been described above with reference to FIG. 1, for example, various modifications of this preferred embodiment of the invention are within the scope of the invention. For example, although yttrium and other dopant materials used in metal oxide resistor materials have been shown being provided by dissolving dopant salts in an aqueous solution as indicated at 10 in FIG. 1, such dopants are present in only relatively small proportion and could be incorporated in the metal oxides by mechanical mixing thereof with the precipitate formed as indicated at 26, 28 or 32 in FIG. 1 or by mechanical mixing or the like with precipitate after it has been calcined as indicated at 34 in FIG. 1, such addition of dopants being prepared in any conventional manner. Similarly, where precipitation of the titanium dioxide or other powders to be placed in suspension has been described with reference to FIG. 2 it will be understood that the precipitation steps indicated at 16, 18, 20 and 22 in FIG. 2 could be omitted in the process of this invention, barium and other related water-soluble compounds being added to the aqueous hydrochloric acid solution indicated at 14 in FIG. 2 to provide a desired suspension-solution such as the suspension-solution indicated at 12 in FIG. 1.

Other modifications of the disclosed process of this invention are also possible within the scope of this invention, this invention including all such modifications and equivalents of the disclosed process falling within the scope of the appended claims.

We claim:
1. A method for producing a mixed metal oxide material incorporating at least one element selected from the group consisting of barium, strontium, calcium and lead and at least one metal selected from the group consisting of titanium, tin and zirconium, said method comprising the steps of combining an aqueous solution of a water soluble compound of at least said one element with an oxide of at least said one metal suspended in an aqueous medium and regulating the pH of said combined solution-suspension to obtain desired stability thereof, thereby to place any water soluble contaminants of said compound in metal oxide in solution in said aqueous medium, removing said aqueous medium with said contaminants to leave a homogeneous mixture of a material incorporating said one element and said metal oxide, and pyrolyzing said mixture for forming said mixed metal oxide material.

2. A method for producing a mixed metal oxide material incorporating at least one element selected from the group consisting of barium, strontium, calcium and lead and at least one metal selected from the group consisting of titanium, tin and zirconium, said method comprising the steps of combining an aqueous solution of a water soluble compound of at least said one element with an aqueous suspension of an oxide of at least said one metal and regulating the pH of said combined solution-suspension to obtain desired stability thereof, commingling said combined solution-suspension with an aqueous carbonate solution for forming a precipitate incorporating a homogeneous mixture of said one metal oxide and a carbonate of said one element in an aqueous medium, filtering said precipitate from aqueous medium, and pyrolyzing said precipitate for forming said mixed metal oxide material.

3. A method for producing a ceramic resistor material of positive temperature coefficient of resistivity comprising the steps of combining an aqueous solution of a water soluble compound of at least on element selected from the group consisting of barium, strontium, calcium and lead and a water soluble compound of at least one dopant selected from the group consisting of yttrium, lanthanum, cerium, dysprosium and praesodymium with an aqueous suspension of an oxide of at least one metal selected from the group consisting of titanium, tin and zirconium and regulating the pH of said combined solution-suspension to obtain desired stability thereof, commingling said combined solution-suspension with an aqueous carbonate solution for forming a precipitate incorporating a homogeneous mixture of at least said one metal oxide and carbonate of at least said one element and said one dopant in an aqueous medium, filtering said precipitate from said aqueous medium, and calcining said precipitate for forming said ceramic resistor material.

4. A method as set forth in claim 3 wherein manganese nitrate is dissolved in said combined solution-suspension so that said precipitate incorporates manganese carbonate homogeneously mixed therein.

5. A method as set forth in claim 3 wherein at least one additional oxide selected from the group consisting of the oxides of manganese and silicon is placed in suspension in said aqueous medium so that said precipitate incorporates at least said one additional metal oxide homogenously mixed therein.

6. A method as set forth in claim 3 wherein a sufficient quantity of water soluble barium, strontium, yttrium and manganese salts are placed in said aqueous solution and wherein a sufficient quantity of titanium and silicon dioxides are placed in suspension in said aqueous medium so that the combined solution-suspension embodies 0.77 moles barium, 0.23 moles strontium, 0.035 moles silicon and 0.006 moles yttrium for each 1.01 moles titanium and embodies sufficient manganese to comprise about 170 ppm. of the resulting ceramic resistor material, whereby said calcined precipitate displays a Curie temperature of approximately 57°C.

7. A method as set forth in claim 3 wherein a sufficient quantity of water soluble barium, lead, yttrium and manganese salts are placed in said aqueous solution and wherein a sufficient quantity of titanium and silicon dioxides are placed in suspension in said aqueous medium so that the combined solution-suspension embodies 0.98 moles barium, 0.02 moles lead, 0.035 moles silicon and 0.007 moles yttrium for each 1.01 moles titanium and embodies sufficient manganese to comprise about 150 ppm. of the resulting ceramic resistor material, whereby said calcined precipitate displays a Curie temperature of approximately 140°C.

8. A method as set forth in claim 3 wherein a sufficient quantity of water soluble barium, lead, yttrium and manganese salts are placed in said aqueous solution and wherein a sufficient quantity of titanium and silicon dioxides are placed in suspension in said aqueous medium so that the combined solution-suspension embodies 0.89 moles barium, 0.11 moles lead, 0.035 moles silicon and 0.006 moles yttrium for each 1.01 moles titanium and embodies sufficient manganese to comprise about 100 ppm. of the resulting ceramic resistor material, whereby said calcined precipitate displays a Curie temperature of approximately 180°C.

9. A method as set forth in claim 3 wherein a sufficient quantity of water soluble barium, lead and yttrium salts are placed in said aqueous solution and wherein a sufficient quantity of titanium and silicon dioxides are placed in suspension in said aqueous medium so that the combined solution-suspension embodies 0.95 moles barium, 0.05 moles lead, 0.03 moles silicon and 0.006 moles yttrium for each 1.01 moles titanium, whereby said calcined precipitate displays a Curie temperature of approximately 154°C.

10. A method as set forth in claim 3 wherein a sufficient quantity of water soluble barium, lead, yttrium and manganese salts are placed in said aqueous solution and wherein a sufficient quantity of titanium and silicon dioxides are placed in suspension in said aqueous medium so that the combined solution-suspension embodies 0.84 moles barium, 0.16 moles lead, 0.03 moles silicon and 0.006 moles yttrium for each 1.02 moles titanium and embodies sufficient manganese to comprise about 50 ppm. of the resulting ceramic resistor material, whereby said calcined precipitate displays a Curie temperature of approximately 200°C.

11. A method as set forth in claim 3 wherein a sufficient quantity of water soluble barium, strontium and yttrium salts are placed in said aqueous solution and wherein a sufficient quantity of titanium and silicon dioxides are placed in suspension is said aqueous medium so that the combined solution-suspension embodies 0.95 moles barium, 0.05 moles strontium, 0.035 moles silicon, and 0.004 moles yttrium for each 1.01 moles titanium, whereby said calcined precipitate displays a Curie temperature of approximately 115°C.

12. A method as set forth in claim 3 wherein a sufficient quantity of water soluble barium, lead, yttrium and manganese salts are placed in said aqueous solution and wherein a sufficient quantity of titanium and silicon dioxides are placed in suspension in said aqueous medium so that the combined solution-suspension embodies 0.91 moles barium, 0.09 moles lead, 0.035 moles silicon and 0.006 moles yttrium for each 1.01 moles titanium and embodies sufficient manganese to comprise about 150 ppm. of the resulting ceramic resistor material, whereby said calcined precipitate displays a Curie temperature of approximately 165°C.

13. A method as set forth in claim 3 wherein a sufficient quantity of water soluble barium, strontium and yttrium salts are placed in said aqueous solution and wherein a sufficient quantity of titanium and silicon dioxides are placed in suspension in said aqueous medium so that the combined solution-suspension embodies 0.86 moles barium, 0.14 moles strontium, 0.035 moles silicon and 0.006 mole yttrium for each 1.02 moles titanium and embodies sufficient manganese to comprise about 226 ppm. of the resulting ceramic resistor material, whereby said calcined precipitate displays a Curie temperature of approximately 80°C.

14. A method as set forth in claim 3 wherein a sufficient quantity of water soluble barium, strontium and yttrium salts are placed in said aqueous solution and wherein a sufficient quantity of titanium and silicon dioxides are placed in suspension in said aqueous medium so that the combined solution-suspension embodies 0.93 moles barium, 0.07 moles strontium, 0.035 moles silicon and 0.006 moles yttrium for each 1.01 moles titanium and embodies sufficient manganese to comprise about 230 ppm. of the resulting ceramic resistor material, whereby said calcined precipitate displays a Curie temperature of approximately 105°C.

* * * * *